Figure 2A:
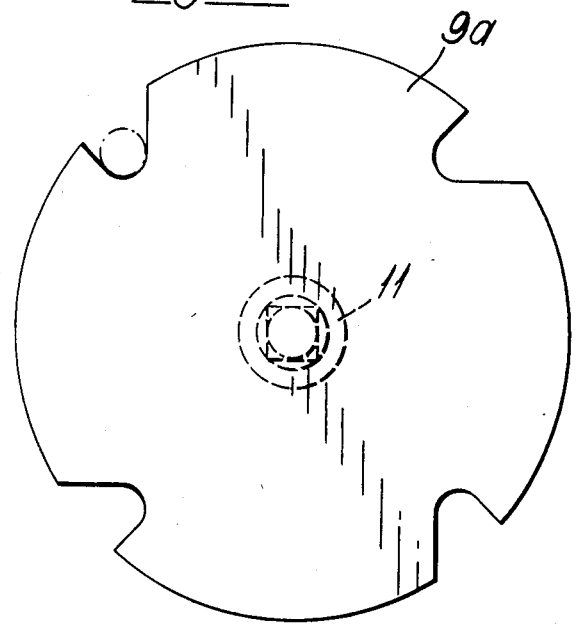

United States Patent [19]

Biggs

[11] Patent Number: 4,579,517

[45] Date of Patent: Apr. 1, 1986

[54] APPARATUS FOR FORMING AND HANDLING SECTIONED PRODUCTS

[75] Inventor: Donald R. Biggs, Bedford, England

[73] Assignee: Thomas J. Lipton, Englewood Cliffs, N.J.

[21] Appl. No.: 589,099

[22] PCT Filed: Jun. 29, 1983

[86] PCT No.: PCT/GB83/00164

§ 371 Date: Feb. 22, 1984

§ 102(e) Date: Feb. 22, 1984

[87] PCT Pub. No.: WO84/00097

PCT Pub. Date: Jan. 19, 1984

[30] Foreign Application Priority Data

Jun. 29, 1982 [GB] United Kingdom ............... 8218775

[51] Int. Cl.$^4$ .......................... A23G 3/02; A23G 9/22
[52] U.S. Cl. .................................. 425/510; 198/377; 425/517; 425/126 S; 425/289
[58] Field of Search ............ 198/377; 425/126 S, 425/289, 296, 308, 315, 500, 505, 506, 510, 511, 516, 517

[56] References Cited

U.S. PATENT DOCUMENTS

| 2,732,925 | 1/1956 | Pechy .................................. 198/377 |
| 2,779,453 | 1/1957 | Lippert et al. ...................... 198/377 |
| 3,169,494 | 2/1965 | Jernigan et al. . |
| 4,159,612 | 7/1979 | Johnson et al. .................. 425/126 S |

FOREIGN PATENT DOCUMENTS

| 581855 | 8/1933 | Fed. Rep. of Germany . |
| 2427818 | 8/1980 | Fed. Rep. of Germany . |
| 845968 | 8/1960 | United Kingdom . |

Primary Examiner—Willard E. Hoag
Attorney, Agent, or Firm—Brumbaugh, Graves, Donohue & Raymond

[57] ABSTRACT

Apparatus for handling edible products, comprising means for laying down a length of edible product on to a takeoff conveyor and cutting the length into sections, characterized by the use of a line of successive travelling turntables along and on which the length is laid, and by cutting the length into sections between the turntables in a manner which allows relative separation by rotation of the cut sections, and by rotating each turntable carrying a cut section through a defined angle, thereby to present a cut end of the section substantially transversely of the line of the conveyor.

5 Claims, 3 Drawing Figures

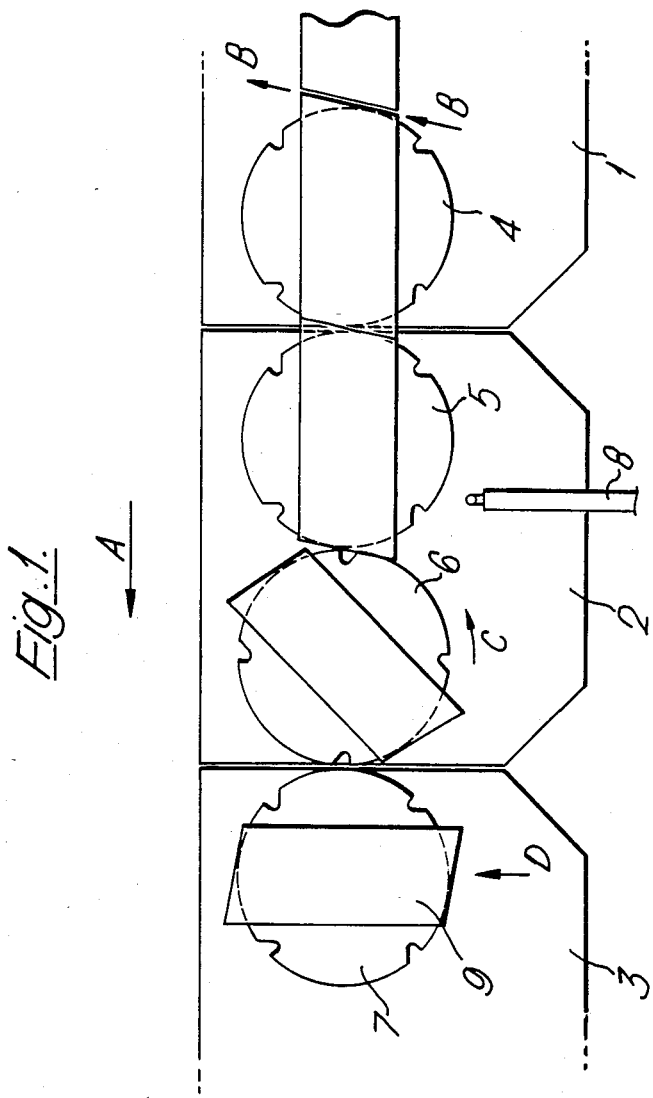

APPARATUS FOR FORMING AND HANDLING SECTIONED PRODUCTS

This invention relates to processes and apparatus for forming and handling sectioned products, and to the products so formed. In particular embodiments, the invention is applicable for example to the formation of composite products made from sections of extruded material, and is especially useful for the production of composite products made from sections of an extruded foodstuff, e.g. an aerated and/or frozen confectionery material.

It is commonly desired to process extruded materials (or other materials formed in long lengths) after their extrusion or formation by other means, e.g. by changing their shape or adding further components. Handling is relatively simple when it is to be done laterally with respect to the length of the material, but harder when the material is to be sectioned and the cut ends subjected to further processing.

According to this invention, such handling is simplified and made convenient by a conveyor apparatus comprising a line of successive turntables along and on which a long piece of material can be laid; means for cutting the piece material into sections between each pair of adjacent turntables in such a manner as to allow relative separation by rotation of the cut surfaces of sections so cut, and means for rotating the sections so cut through a defined rotation angle in order to present their cut surface laterally (transversely) or approximately laterally with respect to the direction of motion and the line of the conveyor, to allow processing of the cut ends. Preferably the apparatus also includes arrangements to hold the turntables in steady orientation except when they are under operation by rotating means, and means for rotating them at a desired stage of the operation by some desired angle, e.g. 90°.

It will be clear to the reader of the above description that the cutting needs to be done in such a way that the cut sections can be independently rotated past each other, so that the cut surfaces of the sections can be separated without signficantly fouling each other. Two examples of ways of achieving this are (a) to make an oblique cut (see FIG. 1 below) or (b) especially for example in the case of soft or compressible materials, to use a thick wedge-shaped cutter which at the same time as cutting creates a gap between the cut sections.

This arrangement of apparatus and handling processes according to the invention has been found useful in allowing the cut ends of the sections to be further treated by auxiliary apparatus located at the side of the conveyor, e.g. apparatus for inserting sticks into the cut ends of an extruded product. The arrangement according to the invention thus allows the use for this purpose of auxiliary apparatus of a form which in itself is conventional. Thus a requirement of awkward processing in the line of the conveyor is avoided.

In one embodiment, the invention provides a plate conveyor suitable for operation in a freezer tunnel, incorporating plates which are easily exchangeable with (for example) conveyor units incorporating turntables as described above. Such exchangeability can be facilitated for example by arranging for the plates to be removably fixed to the conveyor substructure by means of a releaseable lug-and-flange fixing located at one side of each removable plate. This can allow release of the plate by upward rotation about the fixing, and its replacement, after location of the fixing, by downward rotation about the fixing.

According to a further embodiment of the invention, the releaseable plates can incorporate turntable units as described above.

The invention is illustrated for example in one embodiment by reference to the accompanying drawings.

FIG. 1 of the drawings shows a fragmentary and diagrammatic plan view of three plate units of a conveyor according to one embodiment of the invention, incorporating turntable units of which four are shown.

Figure 2B:
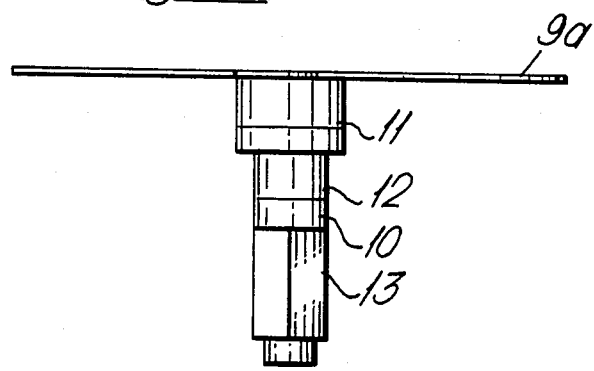

FIGS. 2a and 2b show respectively a plan and elevation of a turntable unit from the conveyor of FIG. 1.

Referring to FIG. 1, plates 1,2,3 are shown, and form part of a plate conveyor which in itself is of conventional kind. The plates advance either stepwise or continuously in direction A. Each plate has mounted on it two rotatable turntables (four shown in FIG. 1 as 4,5,6,7). In between turntable 4 and its predecessor in line (not shown) there is mounted a cutting device for transversely and obliquely cutting into sections an elongate (e.g. extruded) material laid on the conveyor. This material can for example be a length of extruded frozen confection material such as ice cream.

The cutting device is arranged to cut along the direction indicated by arrows B. The cutting device can be either (longitudinally) fixed and coordinated in its upwards and downwards cutting motion with a stepwise motion of the conveyor, or else cyclically moved both vertically and longitudinally into registration with successive pairs of turntables during continuous motion of the conveyor, according to mechanical arrangements which in themselves are well known to those skilled in the art.

A rotating device 8 is arranged to rotate successive turntables carrying sections of the elongate material by 90°, in direction shown by arrow C. In the arrangement shown, each turntable has four engagement points for the rotating device, spaced equally abouts its periphery. These engagement points may be fitted with lugs or indentations for engagement of a complementary actuating device, and the turntables are arranged so that they are stable in successive orientations which are spaced 90° apart (e.g. they can be kept in orientation by ball-and-socket positive engagement). The turntable units rotate from one orientation to the next when actuated by device 8, which can for example be any desired kind of adjustable trip arm.

Turntable 7 is shown in orientation spaced 90° from its original orientation, and presenting an oblique-cut section 9 of the elongate material transversely to the line of motion of the conveyor, thereby to facilitate subsequent processing of the section at its cut surface, e.g. by addition of another material, such as a stick, to form a composite sectioned product.

FIGS. 2a and 2b show respectively a plan and elevation of one suitable embodiment of a turntable unit such as 4,5,6 or 7 in slightly greater detail.

Turntable platter 9a is fixed to a vertical shaft 10 comprising a boss portion 11 and a bearing portion 12, which in use are located on and within a journal of any suitable bearing material, which is mounted in the respective plate such as plate 2 of FIG. 1. It has been found especially convenient to use a porous (e.g. sintered) metal bearing impregnated with any suitable lubricant.

Also comprised in vertical shaft 10 is a lower faceted section 13, which is shaped to be square in section. In use, with the turntable mounted in the plate, the faceted section 13 can be clasped between the two leaf springs or other resilient stops. These exert enough force to stabilise the turntable in the absence of a rotating force. Rotating force can be applied as described in relation to FIG. 1, e.g. by application of a catch or pawl to one of four successive indentations in the circumference of the turntable platter.

There is no need for the platters to be flat. They can have dish-shaped or otherwise shaped top surfaces, to receive and support a length of material to be cut and handled, according to any desired cross-section.

It can be seen that the arrangement as described provides discontinuous and sequential rotation, through a defined angle of rotation, of each of a series of travelling turntables on which there lies the length of material to be sectioned and handled, and each turntable is made to rotate after the portion of the material which it carries has been cut to separate it from the remainder.

It is apparent that the invention is applicable for example to the handling and formation of edible products such as frozen confectionery pieces into which sticks are to be inserted to form stick products such as ice cream stick bars and the like. It is also apparent that many variations and modifications of the apparatus and its use can be applied without departing from the essentials of this disclosure.

I claim:

1. Apparatus for handling lengths of edible products comprising:

a conveyor which can be arranged to receive a length of edible products, wherein the conveyor includes a plurality of successive traveling turntables mounted to the conveyor along and on which the length can be laid;

means for cutting the length into separate sections between the turntables in a manner which allows relative separation of the cut sections to allow for rotation of the turntables carrying cut sections; and means for rotating each turntable carrying a separate cut section through a defined angle so that the cut end of the section is presented on the turntable and substantially transverse to the line of the conveyor.

2. The apparatus as defined by claim 1, wherein the conveyor comprises a plate conveyor suitable for operation in a freezer tunnel having sets of plates mounted to the conveyor, wherein the plates are exchangeable so that plates having nonrotatable platters mounted thereon are exchangeable for plates having rotatable turntables mounted thereon.

3. Apparatus according to claim 1, wherein said cutting means are arranged to cut the length obliquely into sections to allow their rotation through said defined angle.

4. Apparatus according to claim 1, wherein said cutting means are arranged as a cutting wedge to cut the length into sections and separate the sections to allow their rotation through said defined angle.

5. Apparatus according to claim 1, in combination with an inserter device to insert a stick or handle into the cut ends of the sections presented transversely of the line of travel of the conveyor.

* * * * *